Patented July 27, 1926.

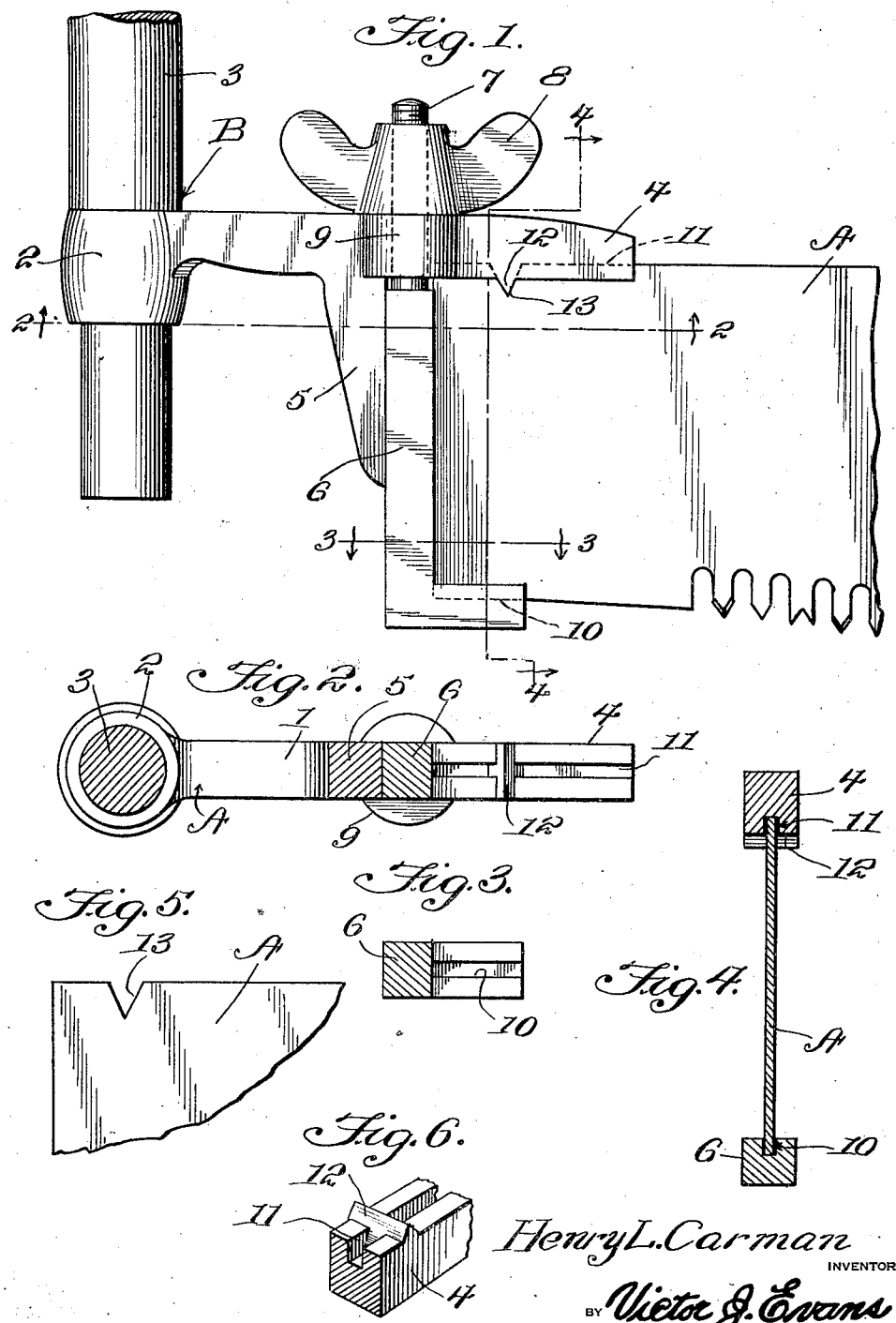

1,594,240

UNITED STATES PATENT OFFICE.

HENRY L. CARMAN, OF FLAGSTAFF, ARIZONA.

SAW HANDLE.

Application filed February 18, 1925. Serial No. 10,090.

This invention relates to a saw handle, mainly designed for cross cut saws, the general object of the invention being to provide means for detachably connecting the handle with the saw so that the handle can be easily removed from or placed on a saw and which will be firmly connected with the saw when placed thereon.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation showing the invention in use.

Figure 2 is a section on line 2—2 of Figure 1.

Figure 3 is a section on line 3—3 of Figure 1.

Figure 4 is a section on line 4—4 of Figure 1.

Figure 5 is a fragmentary view of the upper corner of a saw.

Figure 6 is a fragmentary view of the upper arm of the handle.

In these views, A indicates a portion of the saw blade and B indicates the handle. This handle comprises a part 1 having a socket 2 at one end thereof for receiving the hand grasp 3 and a horizontal arm 4 at its other end. A vertical arm 5 depends from the part 1 and has its outer face forming a guide for an L-shaped member 6, the upper end of which is threaded, as at 7, to receive a nut 8, the threaded portion passing through a hole in a boss formed at the junctions of the arms 4 and 5 of the member 1. The rest of the member 6 is of square shape in cross section with its short horizontal part provided with a groove 10 in its upper face to receive a portion of the lower edge of the saw blade. The end of the saw blade abuts the flat outer face of the long part of the member 6 and the lower edge of the arm 4 is provided with a groove 11 to receive a portion of the upper edge of the saw blade, this groove being bisected by a projection 12 for engaging a notch 13 in the upper edge of the saw blade.

From the foregoing it will be seen that by loosening the nut 8 the short part of the member 6 can be moved away from the arm 4 so that the saw blade can be placed between the two parts with its notch 13 engaging the projection 12 on the arm 4. Then the nut is tightened to move the member 6 upwardly until the groove 10 in the short part of the member 6 will engage the lower edge of the saw blade and thus firmly clamp the handle on the blade.

With this invention the handle can be easily and quickly removed from the blade or replaced thereon and when in position it will be firmly held to the blade.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a saw blade having a notch formed in its upper edge, a handle having a horizontal part and a vertical depending part, the horizontal part being grooved to receive an edge of the blade, a boss formed on the horizontal part having an opening therethrough, a projection on said horizontal part for engaging the notch, an L-shaped member having a groove in its horizontal part for receiving an edge of the saw blade and its vertical part being arranged between the edge of the blade and the vertical depending part, a threaded stem on the L-shaped member extending through the boss on the horizontal part and a nut threaded upon the stem for causing the L-shaped member to clamp the blade between itself and the horizontal part when the nut is tightened.

In testimony whereof I affix my signature.

HENRY L. CARMAN.